United States Patent [19]

Obata et al.

[11] Patent Number: 5,146,105
[45] Date of Patent: Sep. 8, 1992

[54] INTERNAL PRESSURE EXPLOSION-PROOF SYSTEM

[75] Inventors: Mitsuyoshi Obata; Noboru Takagi, both of Kobe, Japan

[73] Assignee: Kabushiki Kaisha Kobe Seiko Sho, Kobe, Japan

[21] Appl. No.: 588,850

[22] Filed: Sep. 27, 1990

[30] Foreign Application Priority Data

Oct. 6, 1989 [JP] Japan .................... 1-262630

[51] Int. Cl.$^5$ ......................... H02B 13/055
[52] U.S. Cl. .................... 307/118; 307/328; 361/2; 174/11 R
[58] Field of Search ............. 307/118, 328; 137/487.5; 361/2, 14, 120, 123, 178, 331, 334, 335; 174/11 R, 14 R, 15.1; 340/611

[56] References Cited

U.S. PATENT DOCUMENTS 3,934,454  1/1976  Simo ..................... 73/29.02
4,607,245  8/1986  Kuroda et al. ............ 336/57
4,802,502  2/1989  Williams ................. 137/382

Primary Examiner—Todd E. DeBoer
Assistant Examiner—David Osborn
Attorney, Agent, or Firm—Oblon, Spivak, McClelland, Maier & Neustadt

[57] ABSTRACT

An internal pressure explosion-proof system by which an electric motor or the like is not rendered operative until after gas in an airtight vessel is replaced with certainty by protective gas. The internal pressure explosion-proof system includes a gas flow detector provided in an exhaust pipe for detecting an amount of protective gas exhausted from an airtight vessel in which an electric appliance which may produce a spark or fire is accommodated, and a controller for enabling operation of the electric appliance when a flow amount detected by the gas flow rate detector when protective gas is fed into the airtight vessel reaches a predetermined level and the internal pressure of the airtight vessel exceeds another predetermined level.

3 Claims, 2 Drawing Sheets

INTERNAL PRESSURE EXPLOSION-PROOF SYSTEM

BACKGROUND OF THE INVENTION

1. Field of the Invention

This invention relates to an internal pressure explosion-proof system, and more particularly to an internal pressure explosion-proof system for use with an electrically operated robot or the like which is used in an explosive atmosphere.

2. Description of the Prior Art

Various internal pressure explosion-proof systems of the type mentioned are already known, and an exemplary one of such conventional internal pressure explosion-proof systems is disclosed, for example, in Japanese Utility Model Laid-Open No. 63-131390. The internal pressure explosion-proof system is shown in FIG. 2. Referring to FIG. 2, the internal pressure explosion system is generally denoted by 1a and is constituted such that protective gas from a compressor 8 is fed by way of a supply pipe 4 and a pair of air regulators 15 interposed in the supply pipe 4 into an airtight vessel 3a and then into a plurality of airtight vessels 3b all installed in an explosive dangerous zone which is defined by an alternate long and short dash line a in FIG. 2. The protective gas is then exhausted outside by way of exhaust pipes 5 individually connected to the airtight vessels 3b. An electric appliance such as a servomotor M or the like which may produce a spark or fire is installed in the inside of each of the airtight vessels 3b. In order to prevent explosive gas from being admitted into the airtight vessels 3a and 3b, the internal pressure of each of the airtight vessels 3a and 3b is set to a level a little higher than the pressure of an explosive atmosphere therearound.

Further, in order to prevent explosive gas in an atmosphere around the airtight vessels 3a and 3b from being admitted into any of the airtight vessels 3a and 3b when the internal pressure of the airtight vessel 3a or 3b drops or when the airtight vessel 3a or 3b is disassembled for the inspection thereof, a pressure switch 10 for detecting an internal pressure of an airtight vessel 3b is provided for each of the airtight vessels 3b on the upstream side in the gas feeding direction as indicated by a widened arrow mark with respect to a master valve 17 which is disposed at a terminal end of the exhaust pipe 5 for the airtight vessel 3b. The pressure switch 10 functions also as pressure setting means for manually setting the internal pressure of the airtight vessel 3b or 3a to a predetermined level a little higher than the explosive atmosphere therearound.

Meanwhile, in case the motors M or the like have rested from operation for a long interval of time, the internal pressures of the airtight vessels 3a and 3b may have dropped to the same pressure as that of the explosive atmosphere therearound during such rest from operation and explosive gas in the explosive atmosphere may have been admitted into the airtight vessels 3a and 3b. Normally, when any of the servomotors M is to be started from such situation, the master valves 17 are opened so that gas in the pressure vessels 3a and 3b may be replaced by protective gas.

Another internal pressure explosion-proof system which is constructed to discharge gas existing at an innermost portion of an airtight vessel to the outside in advance before a servomotor is started after a rest from operation for a long interval of time is disclosed in Japanese Patent Laid-Open No. 61-125791. In this manner, an electrically operated robot such as, for example, a coating robot which is used in an explosive atmosphere normally includes an internal pressure explosion-proof system by which the safety of explosion-proof is assured with certainty.

However, the conventional internal pressure explosion-proof systems described above are disadvantageous in that, if a bend or choking of an exhaust pipe 5 takes place between the corresponding pressure switch 10 and master valve 17, ventilation in the pipe 5 will be insufficient. Consequently, it may be erroneously judged by the pressure switch 10 that the pressure within the airtight vessels 3a and 3b remains within a normal range while actually gas in some of the airtight vessels 3a and 3b has not yet been sufficiently scavenged by protective gas. Accordingly, the safety of explosion-proof cannot be assured sufficiently.

SUMMARY OF THE INVENTION

Accordingly, it is an object of the present invention to provide an internal pressure explosion-proof system by means of which an electric motor or the like is not rendered operative until after gas in an airtight vessel is replaced with certainty by protective gas.

In order to attain the object, according to the present invention, there is provided an internal pressure explosion-proof system wherein a supply pipe for feeding therethrough protective gas into an airtight vessel in which an electric appliance which may produce a spark or fire is accommodated and an exhaust pipe for exhausting therethrough the protective gas from the airtight vessel are connected to the airtight vessel and an internal pressure of the airtight vessel is detected in order to maintain the internal pressure of the airtight vessel at a pressure higher than the pressure of an atmosphere therearound. The internal pressure explosion-proof system comprising gas flow rate detecting means provided for the exhaust pipe for detecting an exhaust rate of protective gas, and control means for enabling operation of the electric appliance when a flow amount detected by the gas flow amount detecting means when protective gas is fed into the airtight vessel reaches a predetermined level and the internal pressure of the airtight vessel exceeds another predetermined level.

With the internal pressure explosion-proof system, when predetermined checking is to be performed such as, for example, when the electric appliance such as an electric motor which may produce a spark or fire is to be started after a rest from operation for a long interval of time, protective gas is first fed into the airtight vessel, and an exhaust rate of the protective gas which has passed through the airtight vessel and the exhaust pipe then is detected by the gas flow amount detecting means. Then, when the exhaust rate reaches the predetermined level which may be, for example, an amount of air required to scavenge explosive gas in the airtight vessel and exhaust pipe with certainty and the internal pressure of the airtight vessel reaches the predetermined level, the controlling means enables operation of the electric appliance. Accordingly, in case scavenging is insufficient at the exhaust pipe, the exhaust rate will not reach the predetermined level and the electric appliance will not be rendered operative. Or in other words, the electric appliance will not be rendered operative until after gas in the airtight vessel is fully replaced by protective gas and the pressure therein is raised to a pressure higher than the predetermined level. Consequently, such problem of insufficient scavenging of the inside of the airtight vessel is eliminated and the safety of explosion-proof is assured with certainty.

The above and other objects, features and advantages of the present invention will become apparent from the following description and the appended claims, taken in conjunction with the accompanying drawings in which like parts are denoted by like reference characters all through the drawings.

DETAILED DESCRIPTION OF THE PREFERRED EMBODIMENT

Figure 1:
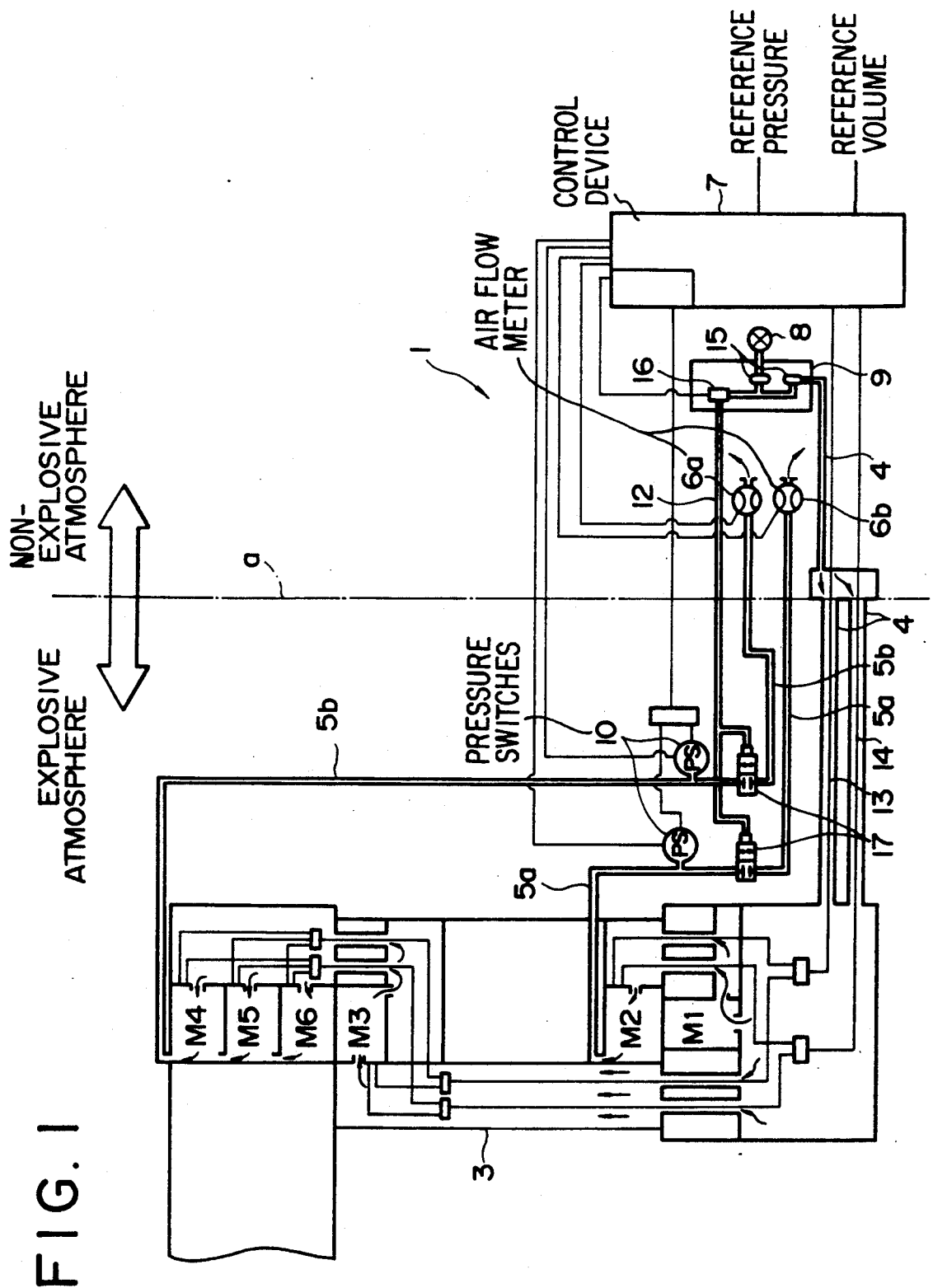
FIG. 1 is a circuit diagram of an internal pressure explosion-proof system showing an embodiment of the present invention.
Figure 2:
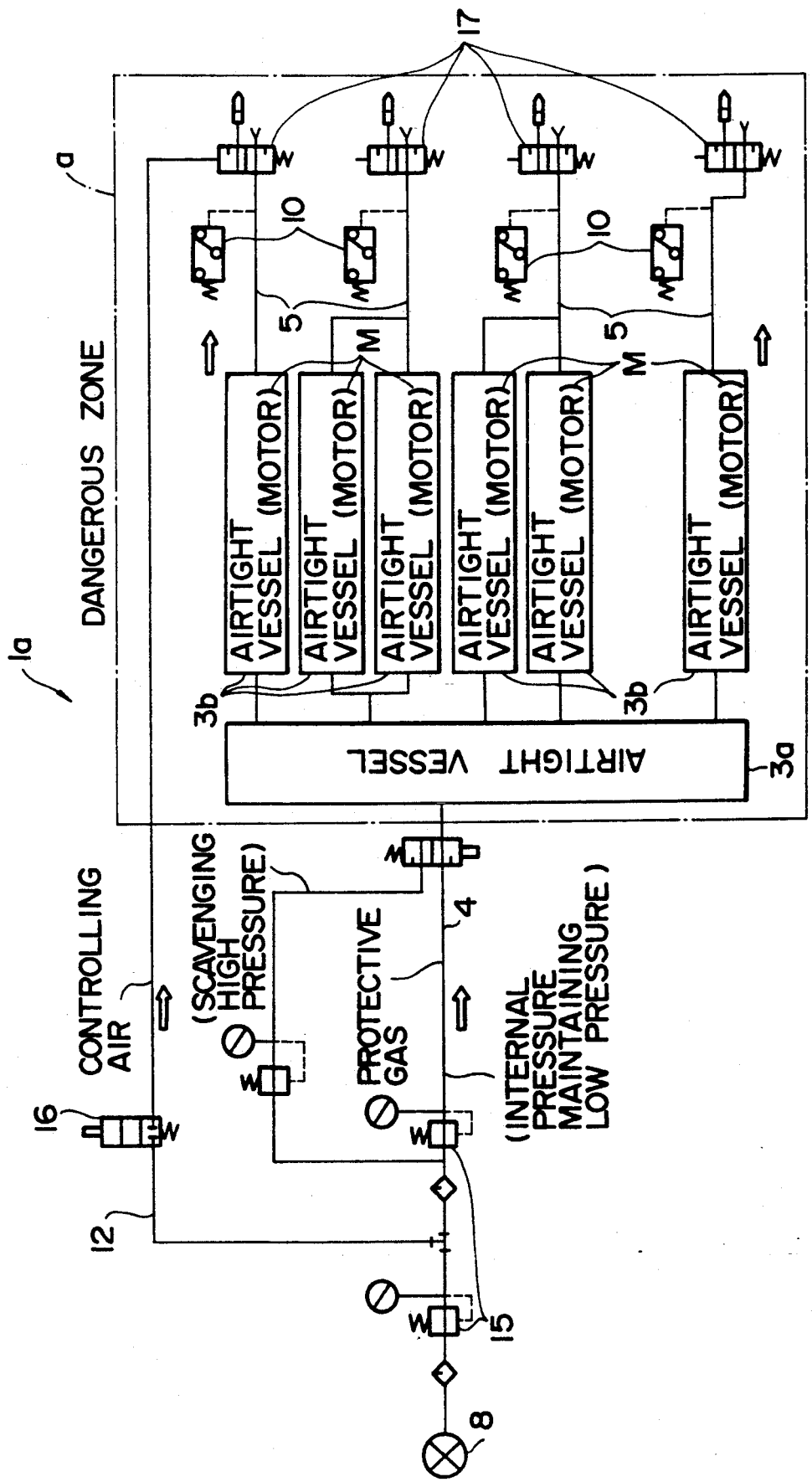
FIG. 2 is a circuit diagram of a conventional internal pressure explosion-proof system.

Referring to FIG. 1, there is shown an internal pressure explosion-proof system to which the present invention is applied. The internal pressure explosion-proof system is generally denoted at 1 and is somewhat common in construction to the conventional internal pressure explosion-proof system 1a described hereinabove with reference to FIG. 2. The internal pressure explosion-proof system 1 is principally different from the conventional internal pressure explosion-proof system 1a of FIG. 2 in that a pair of air flow meters 6a and 6b of the integrating type for detecting amounts of exhaust air which serves as protective gas are provided at terminal ends of a pair of exhaust pipes 5a and 5b and that a microprocessor is provided which enables driving of electric motors M1 to M6 when flow amounts detected by the air flow meters 6a and 6b when air is fed into a manipulator or airtight vessel 3 prior to starting of any of the electric motors M1 to M6 after a rest from operation, reach, for example, a sufficient level to scavenge explosive gas in the manipulator 3 and exhaust pipes 5a and 5b with certainty and the internal pressure of the manipulator 3 exceeds a preset level.

The microprocessor may include a general purpose central processing unit (CPU) and a memory and is provided in a control device 7. A power line 13 for supplying power therethrough and a signal line 14 for outputting starting and stopping instruction signals therethrough extend from the control device 7 to each of the electric motors M1 to M6. The power line 13 and signal line 14 are threaded, at portions thereof which lie in an explosive atmosphere shown on the left-hand side of an alternate long and short dash line a in FIG. 1, in flow routes of scavenging air.

Air supplied from a compressor 8 is branched into controlling air and scavenging air within an air panel 9. Scavenging air is regulated by one of the air regulators 15 and divided in the manipulator 3 into two flows including a flow which will be supplied to the electric motors M1 and M2 in the manipulator 3 via supply pipe 4 and another flow which will be supplied to the electric motors M3 to M6. Then, scavenging air of the two flows is exhausted by way of the exhaust pipes 5a and 5b, respectively.

On the other hand, controlling air is introduced from an air regulator 15 by way of a solenoid valve 16 into a controlling pipe 12 connected to a pair of master valves 17. Thus, when there is the possibility that explosive gas may be admitted into the manipulator 3 such as, for example, when scavenging air is not supplied and either of a pair of pressure switches 10 provided for the exhaust pipes 5a and 5b detects a pressure lower than the preset pressure, or when any of the electric motors M1 to M6 is to be started after a rest from operation, the solenoid valve 16 is rendered operative in response to an instruction from the control device 7. Consequently, the master valves 17 are opened and gas in the manipulator 3 is replaced by scavenging air.

In the internal pressure explosion-proof system 1, an amount of air required to scavenge explosive gas in the manipulator 3 and exhaust pipes 5a and 5b with certainty is measured in advance for each flow route. In particular, after a gas other than air, such as, for example, carbon dioxide gas, is filled up into the manipulator 3, scavenging air is supplied into the manipulator 3, and when the concentration of carbon dioxide gas in the manipulator 3 is reduced to 0% by volume, required gas flow rates are actually measured or read out individually from the air flow meters 6a and 6b. Then, such required flow rates are stored as predetermined flow amount data in the memory of the control device 7.

Accordingly, in the internal pressure explosion-proof system 1 constructed as described above, if a bend or choking of either of the exhaust pipes 5a and 5b between the corresponding pressure switch 10 and master valve 17 takes place and ventilation in the pipe is insufficient upon starting of the manipulator 3 after a rest from operation, current integration values of the air flow meters 6a and 6b are compared with the respective predetermined flow rate data by the microprocessor of the control device 7. Then, in case the integration values are smaller than the predetermined flow rate data; that is, in case gas in the manipulator 3 has not been replaced sufficiently by scavenging air, the electric motors M1 to M6 are not rendered operative.

On the contrary, in case the integration values exceed the predetermined flow amount data and the internal pressure of the manipulator 3 exceeds the predetermined level, the electric motors M1 to M6 are set into a condition in which they can be driven at any time. Then, a closing instruction is transmitted from the control device 7 to the solenoid valve 16, and in response to such closing instruction, supply of controlling air is stopped and the master valves 17 are closed. Consequently, the inside of the manipulator 3 is maintained at a pressure a little higher than the pressure of the explosive atmosphere therearound.

In this manner, leakage of gas from the manipulator 3 can be monitored by detecting the internal pressure of the manipulator 3, and admission of explosive gas into the manipulator 3 after such scavenging operation is compensated for.

As described above, with the internal pressure explosion-proof system 1 of the present embodiment, the electric motors M1 to M6 will not be rendered operative until after gas in the manipulator 3 is fully replaced by scavenging air. Accordingly, the safety of explosion-proof can be assured with certainty.

It is to be noted that, while air flow meters of the integrating type are used as the air flow meters 6a and 6b in the embodiment described above, they need not be of such specific type, and air flow meters of some other type such as, for example, the instantaneous flow rate measuring type, may be employed as such air flow meters 6a and 6b. In this instance, time integrated values of instantaneous measurement amounts are used.

Further, a variation in flow rate which may be caused by variations of the pressure and temperature in the flow route of the scavenging air described above can be coped with by providing a temperature detector and a pressure detector in the flow route of the scavenging air and executing a flow rate correcting calculation by means of the control device 7 for the manipulator 3. It is to be noted that an air flow meter having a temperature and pressure correcting function may be adopted for each of the air flow meters described above. The pressure and temperature described above are corrected using the known expressions (1) and (2) given below:

$$C_t = \sqrt{(273 + t_0)/(273 + t)} \quad (1)$$

$$C_p = \sqrt{(1.033 + P)/(1.033 + P_0)} \quad (2)$$

where $C_t$ is a temperature correcting coefficient of gas, $t_0$ is a temperature of designated condition, t is a temperature actually measured, $C_p$ is a pressure correcting coefficient of gas, $P_0$ is a gage pressure of the designated condition, and P is a gage pressure actually measured. Due to such temperature corrections, even in case the overall pipe length from the compressor 8 to the terminal end of the exhaust pipe 5a or 5b by way of the manipulator 3 varies or the choking degree outside the pipe varies so that the pipe resistance to flow of scavenging air is varied, an accurate flow amount can be detected in accordance with a circumstance of such variation. Consequently, the flow rate of scavenging air can be reduced, and accordingly, reduction in scavenging time can be achieved.

Having now fully described the invention, it will be apparent to one of ordinary skill in the art that many changes and modifications can be made thereto without departing from the spirit and scope of the invention as set forth herein.

What is claimed is:

1. An internal pressure explosion-proof system comprising:
    an airtight vessel having therein an electric appliance capable of producing a spark;
    means for introducing a protective gas into said airtight vessel;
    an exhaust pipe connected to said airtight vessel for exhausting a gas from said airtight vessel;
    means for measuring a gas flow volume and a pressure at the exhaust pipe of said airtight vessel; and
    control means for controlling said electric appliance to operate only when the detected flow volume teaches a predetermined level and the pressure in said gastight vessel reaches another predetermined level.

2. The system of claim 1, wherein said gas flow volume measuring means comprises an integrating electric air flow meter.

3. The system of claim 1, wherein said exhaust pipe has a master valve therein and said control means includes means for closing said exhaust pipe via said master valve when the pressure in said airtight vessel reaches said another predetermined level.

* * * * *